(No Model.)
D. L. ABER.
DENTOMETER.
No. 596,022.　　　　　　Patented Dec. 21, 1897.
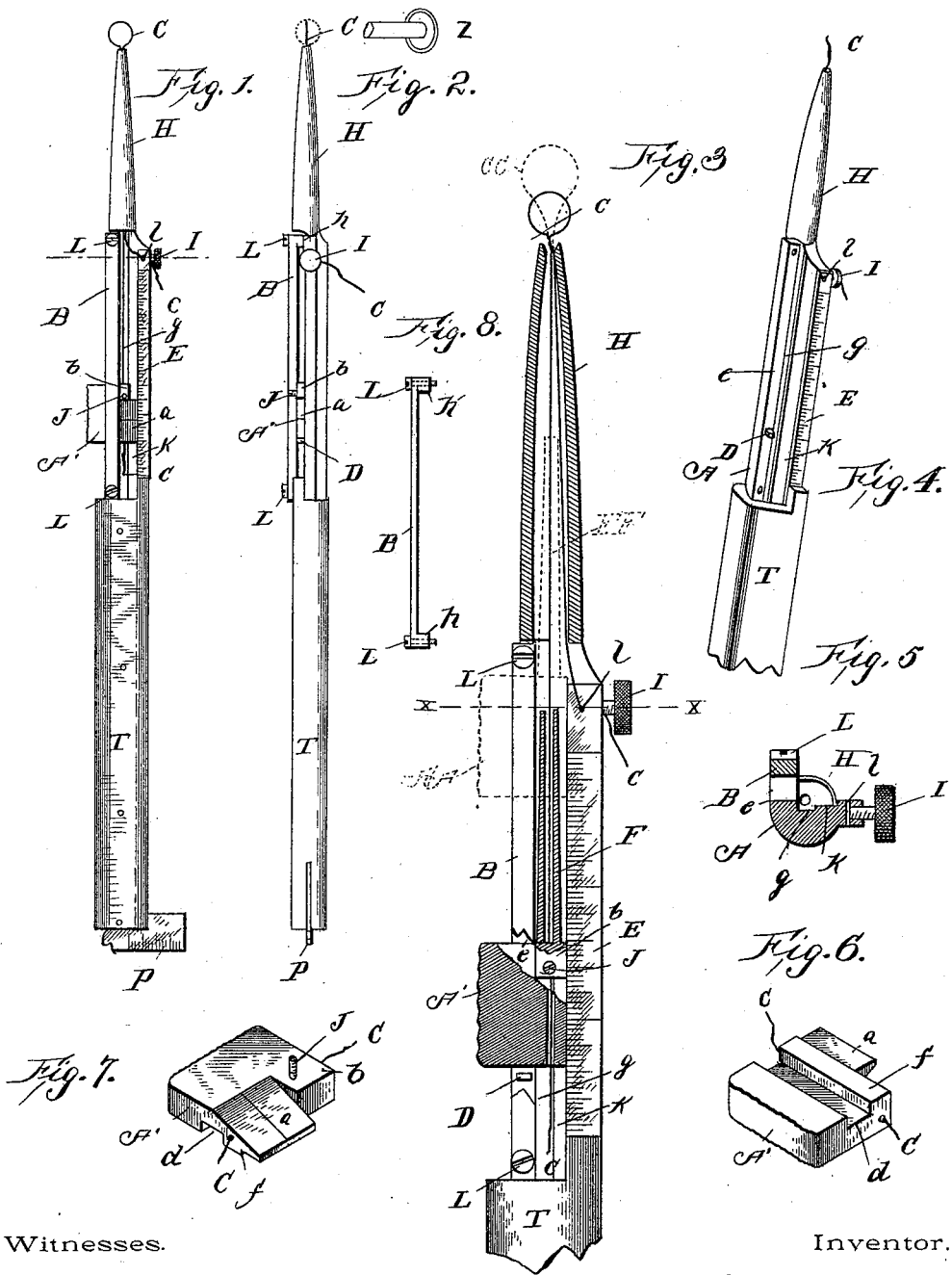
Witnesses.
F. C. Barry
M. F. Haskell
Inventor.
D. L. Aber
per O. E. Duffy
Attorney.

UNITED STATES PATENT OFFICE.

DAVID LINCOLN ABER, OF PITTSBURG, PENNSYLVANIA.

DENTOMETER.

SPECIFICATION forming part of Letters Patent No. 596,022, dated December 21, 1897.

Application filed May 22, 1896. Serial No. 592,517. (No model.)

*To all whom it may concern:*

Be it known that I, DAVID LINCOLN ABER, a citizen of the United States, residing at Pittsburg, in the county of Allegheny and State of Pennsylvania, have invented a new and useful Instrument for Measuring the Perimeters of Irregular Bodies, of which the following is a specification.

My invention relates to improvements in dentometers to be used in the practice of dental surgery for the measurement of teeth and also for the measurement of irregular bodies.

Heretofore dentometers have been made to measure teeth and to retain their contour after measurement of the teeth by tightening the wire around the tooth to be measured and then cutting off the wire after the measurement is made and the tooth finished. The wire is then thrown away and new wire inserted in the instrument for the next measurement, thus wasting the wire, as well as the more valuable time in replacing it in the dentometer. To avoid these objections and to produce an instrument neat, substantial, and scientific in its action and to facilitate an accurate and rapid measurement of such bodies as described are objects of my invention, as follows:

The first object of the invention is to provide an instrument which will accurately register the length of the perimeter of said irregular bodies, such as teeth, upon a scale and to determine their circumference.

A further object of the invention is to so construct an instrument by which the same wire may be employed to consecutively measure any number of bodies of different diameters without removing the wire from the instrument; and a further object is to provide the instrument with removable means for securing the measuring medium to the instrument, one end of the wire being fixed and the other end movable by means of a wire-carrier or cross-head slidable on the body of the instrument.

The invention consists in certain details of construction and combination of parts, as will be hereinafter specifically described, and pointed out in the claims.

Referring to the drawings, Figure 1 is a front view of the dentometer. Fig. 2 is a side view of the same. Fig. 3 shows a central longitudinal section, partly in elevation, made upon an enlarged scale for the better illustration of the several parts. Fig. 4 is a perspective view with the guide-slide B removed, so that the depressed grooves and elevated rib and scale can be readily seen. Fig. 5 is a cross-sectional view taken on the line X X of Fig. 3, looking through the barrel of the instrument from that point. Fig. 6 is an inverted plan view of the wire-carrier, cross-head, and pointer. Fig. 7 is a top plan view of the wire-carrier, cross-head, and pointer. Fig. 8 is a side view of the slide B, between which and the frame the cross-head A' works.

The same letters of reference indicate like parts throughout all the figures.

A is the frame of the instrument, to which is attached handle T, carrying scale P for convenience in measuring heights or other dimensions, and which is pivoted to the handle. This scale may be opened and closed after the manner of a penknife-blade. H is a tapering barrel or cylinder secured to the other end of the frame for the purpose of carrying and directing the wire to the object to be measured.

A' is a wire-carrier or cross-head having a pointer $a$, also a lateral projection $b$, which is drilled and tapped for the reception of binding-screw J, which holds the wire at a predetermined point, and a hole $c$ is also formed longitudinally through the cross-head, through which the measuring-wire C passes. When the wire is in position, the binding-screw J, as before described, is screwed down, holding the wire rigidly in place until released or replaced by another wire.

The inverted view, Fig. 6, shows a slot $d$ in the under side of the cross-head, which is designed to fit and slide on a corresponding ridge or projection $e$, formed on the upper surface of the frame of the instrument, and $f$ is a tongue which fits in a corresponding groove $g$ in the frame. On the side of the frame next the scale E is also formed a ridge $k$, upon which the pointer $a$ slides, and a depression is made on the under side of the pointer to correspond to the ridge K, upon which it rests. The edge of the pointer $a$ snugly fits up to and against the inner edge of the scale, all the parts uniting and adapted to work in unison to form a complete instrument. A hollow guide-needle F is secured to the forward end of cross-head A', through which the measuring-wire C passes. This needle moves back and forth with the cross-head and prevents the wire from buckling or bending when pushed in or out. The movable slide-guide B is made with bosses or projections h h, one on each side, and these are secured to the frame A by screws L L. When in position, this slide holds the cross-head to its place and forms the top guide for said cross-head.

I is a stationary binding-screw and holds the fixed end of the measuring-wire in place. Figs. 3 and 5 show an aperture e through the frame of the instrument into which said fixed end is passed and held by the binding-screw I, as stated.

The operation of the device is as follows: The instrument being adjusted, one end of the measuring-wire is passed through the cross-head A', then through the hollow needle F and out through the barrel or cylinder H. After being passed around gage Z or other body forming a loop the wire then is returned through the barrel, but to one side of the needle, until its other end is passed through aperture l in the frame and rigidly secured by binding-screw I. The cross-head is then moved to the stop D and the wire fastened by binding-screw J and the instrument is ready for use. When the object is to be measured, the cross-head is pushed forward, as shown in dotted lines, pushing the wire out of the small end of the barrel, which action enlarges the loop. The loop formed by the wire is then placed around the object, and when so placed the cross-head is pulled back, indicating on the scale the length of wire around the object measured, giving its exact dimensions. It is obvious that bodies of different diameters may be measured and their exact circumferences given.

When so desired, the barrel or cylinder portion may be removed and a greater or lesser sized barrel substituted, as occasion may require.

It is evident that modifications may be made within the spirit and scope of my invention, and therefore I desire not to limit myself to the form shown and described, but believe myself to be entitled to all such modifications thereof.

Having described my invention, what I claim as new, and desire to secure by Letters Patent, is—

1. The combination in a dentometer of the frame, the cross-head sliding in guides and carrying the pointer, the scale forming the guide for the edge of the pointer, one end of the measuring-wire being attached to said cross-head, the other end of the wire being fixed and its loop passing through said frame, whereby when the cross-head is moved it will tighten the wire and indicate on the scale by means of the pointer, the perimeter of the object to be measured, substantially as set forth.

2. The combination of the body or frame having the movable bar or slide B, the cross-head carrying the pointer and wire, and the binding-screw I, the scale in front of said pointer adapted to indicate the distance of travel of said cross-head, and the stop-pin D, to determine the movement of the cross-head and to prevent its pulling the wire through the barrel, substantially as set forth.

3. The combination in an instrument for measuring irregular bodies, of the body or frame for carrying the movable cross-head, the wire and binding-screw, said cross-head sliding between guides and carrying the hollow needle for the wire and the binding-screw I for holding the fixed end of the wire, as set forth.

4. The combination in an instrument for measuring bodies consisting of the frame or body portion having a scale on its face, a sliding cross-head carrying a pointer and wire, and a hollow needle for the wire to pass through and the barrel H, and fixed binding-screw I, all arranged for joint operation as set forth.

5. An instrument for measuring bodies comprising a body portion or frame, having a scale, grooves and ribs on its face, a sliding cross-head having corresponding grooves and ribs to work therein, said cross-head also carrying the hollow needle, and the pointer a, and the movable slide B, substantially as set forth.

6. The combination in an instrument for measuring bodies of the handle carrying the scale P, the frame A, the tapering cylinder H, the cross-head A' having the pointer a, and projection b, the scale F, and means for securing the ends of the wire, all arranged as set forth.

DAVID LINCOLN ABER.

Witnesses:
JOHN A. LIDDY,
EDWIN CARRELL.